Feb. 20, 1934.   J. J. NOLTE   1,947,872
METHOD OF PRODUCING FROZEN DELICACIES AND CONTAINER THEREFOR
Filed June 11, 1932   2 Sheets-Sheet 1
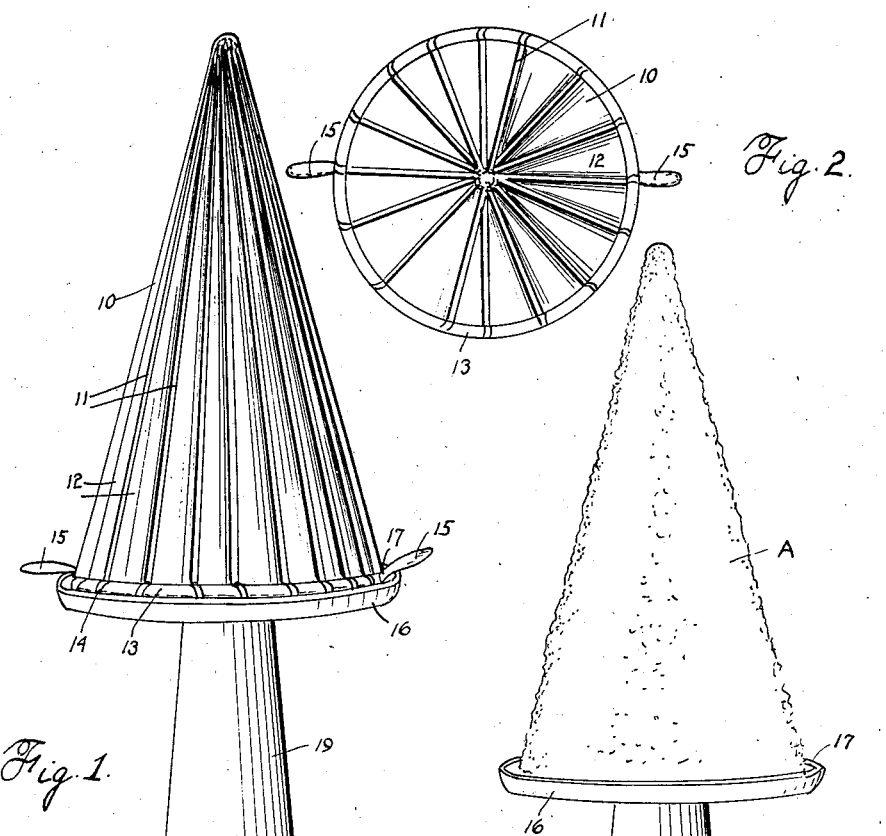
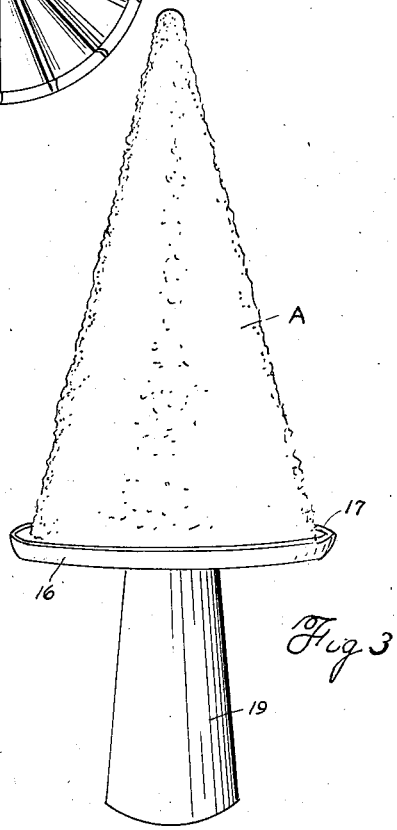
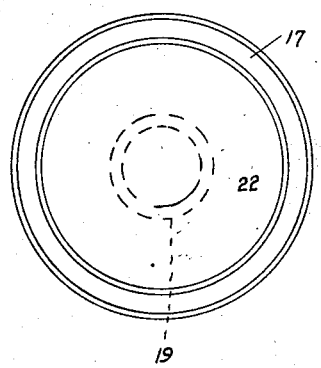
INVENTOR.
John J. Nolte Feb. 20, 1934. J. J. NOLTE 1,947,872
METHOD OF PRODUCING FROZEN DELICACIES AND CONTAINER THEREFOR
Filed June 11, 1932 2 Sheets-Sheet 2
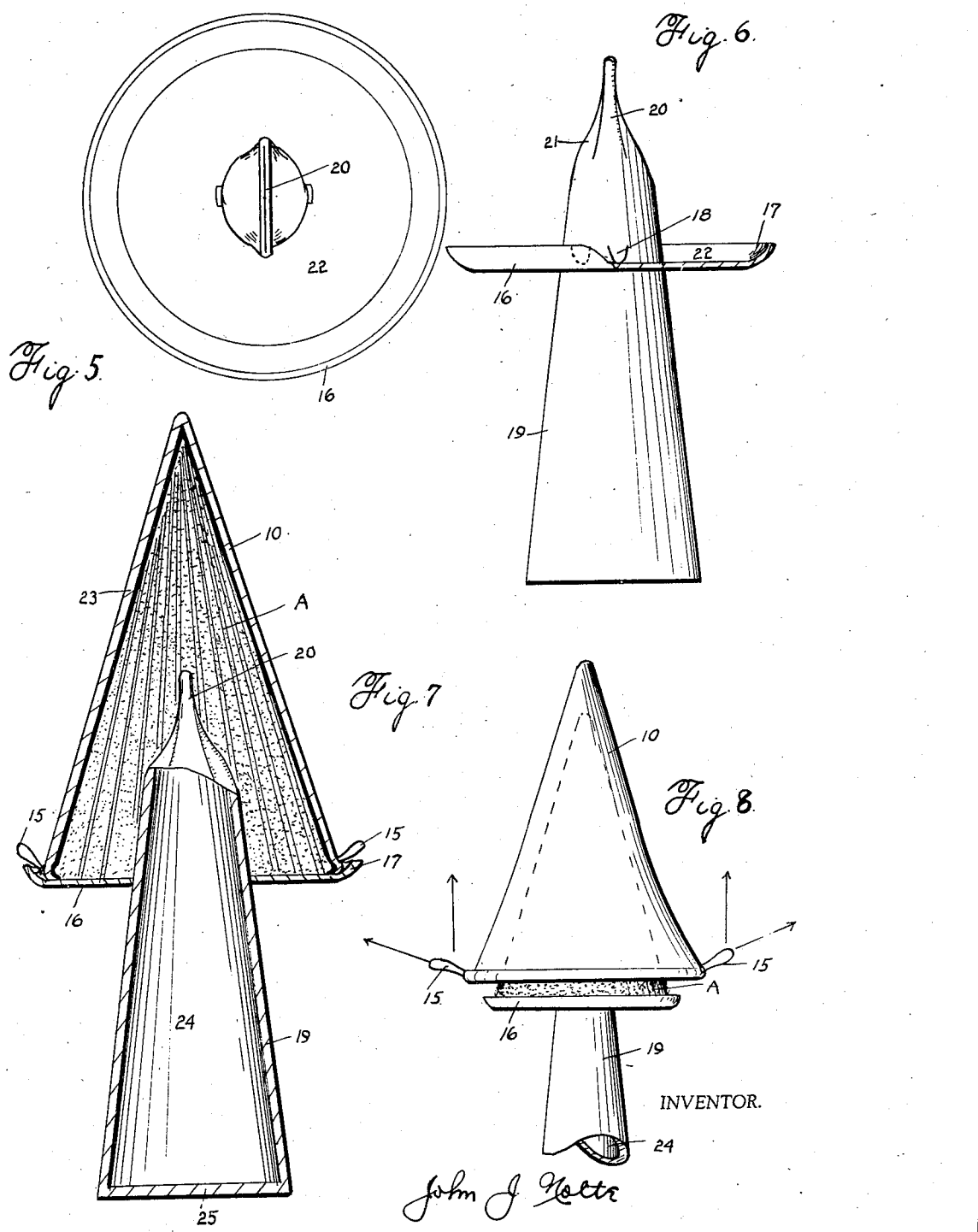
INVENTOR.
John J. Nolte Patented Feb. 20, 1934

1,947,872

UNITED STATES PATENT OFFICE 1,947,872

METHOD OF PRODUCING FROZEN DELICACIES AND CONTAINER THEREFOR

John J. Nolte, Los Angeles, Calif.

Application June 11, 1932. Serial No. 616,738

3 Claims. (Cl. 99—16)

This invention relates to improvements in means and method of producing frozen delicacies such as ice cream, sherbet and the like, and has for its principal object to economize in the time, and to enhance the operation of making the same.

One of the objects of the present invention is to provide certain instrumentalities useful in producing frozen delicacies quickly and inexpensively.

Another important object thereof is to provide a novel method of packaging the ice cream or other frozen delicacy to assure a proper refrigeration thereof.

A further object of this invention is to provide means for properly packaging the frozen delicacy before placed in a condition for sale or use for the purpose of keeping the product intact whilst being placed in the refrigerator or subjected to a refrigerating action.

Another object of this invention is to bring about certain aids in the manufacture of ice cream delicacies and similar edibles in frozen form so that they may be put on the market in a stick form or provided with a holding handle.

A further object thereof is to provide a combination drip pan for the ice cream delicacy, a cover therefor and a handle to administer comfort and convenience to eaters thereof.

Another object of this invention is to provide means for packaging the substance to be frozen whereby time may be saved in the process of completing the refrigeration thereof, and protection is made possible of the edible substance against deterioration or loss of shape after it is frozen.

Another object is to provide a paper container in which the frozen delicacy is to be formed and refrigerated and in which it may finally be manipulated by the purchaser who will be first to remove the container and eat the delicacy out of a drip plate accompanying the container.

A final object of this invention is to provide a container for ice cream delicacies and similar frozen edibles in which the same can be initially produced, and in which the same can be kept intact in a frozen condition until ready to be eaten, and to provide in conjunction with the container a drip and cover plate which itself is provided with a handle.

In carrying out the purposes of the present invention I provide a more convenient way in which to serve ice cream delicacies in package form than the conventional way and there is provided, when my invention is practiced, a drip pan carrying a depending handle, and skirting the base of a preferably cone-shaped paper container, having spreadable portions in the form of pleats or folds, this container being inverted around the ice cream when it is about to be lifted out of contact therewith.

Another important object of this invention is to provide a pair of hand grips upon the paper container in which the ice cream or frozen delicacy is packaged when it leaves the ice cream producer, so that by means of the hand grips, when the same are forcibly pulled apart the paper container may be removed out of contact with the frozen delicacy or peeled off therefrom and completely freed from the frozen delicacy.

A further object thereof is to provide a drip plate and a handle therefor, so that whilst the ice cream or frozen delicacy is packaged in the paper container, the drip plate may adhere to the delicacy and close the container producing a unit package, requiring separation of the container from the delicacy to assure that the latter remain nested in the drip plate, to thereby permit the eater to conveniently get at the ice cream, and to assure that drippings from the ice cream will be received directly in the drip plate and not stream down the sides of the handle.

With the above and other objects in view my invention consists in the arrangement, combination and details of construction disclosed in the drawings and specifications, and then more particularly pointed out in the appended claims.

In the drawings, wherein similar reference characters designate similar parts thruout the respective views, Figure 1 is a perspective view of the container and drip plate cover therefor, Figure 2 is a top plan view thereof, Figure 3 is a side elevation of the device with the container removed, Figure 4 is a top plan view of the drip plate, Figure 5 is a plan view of the drip plate showing the handle properly anchored therein, Figure 6 is a side elevation of the drip plate and handle, partly broken away, Figure 7 is a vertical sectional elevation showing and ice cream packaged in the container, and nested upon the drip plate, and Figure 8 is a side elevation of the container and drip plate showing the action of spreading the container open to free it from the ice cream.

Referring to the drawings, which are merely illustrative of my invention the details of construction of my invention are disclosed, I provide a pliable or paper container and give it a preferably cone-shape and appearance. I form a series of circumferentially spaced apart pleats or folds 11 having intervening spreadable portions 12 therein. The open base portion of the paper container is reinforced and is provided with an annular bead 13 which is also pleated as at 14. Serving as a means of spreading or expanding the paper container are a pair of diametrically oppositely arranged hand grips or hand holds 15 projecting freely laterally of the base of the container and secured thereto or formed integrally thereof.

I provide a drip pan or saucer-shaped paper plate 16 having an outwardly curved flange 17 as shown in Figure 6. There is a hole formed centrally of this drip pan. I provide a preferably paper tubular handle for the drip plate, this handle consisting of a tubular body 19 tapering upwardly from its closed bottom 25, and being hollow interiorly as at 24. The upper portion of this tubular handle is contracted so as to taper at 20 where the pleats or folds 21 are disposed. I take the drip plate and insert its perforated central portion upon the tubular body 19 until the drip plate 16 comes to rest at a point slightly above the center of the handle. It cannot move downwardly below this point as the diameter of the tubular body 19 here is larger than the hole in the drip plate. In order to prevent the drip plate 16 from moving upwardly I provide a series of circumferentially spaced apart integral lugs or tabs 18 upon the tubular handle 19 and press these tabs out in such a manner that the tabs at their lower ends engage the bottom of the drip pan as shown in Figure 6. With the drip plate 16 and handle body 19 assembled in proper relationship as shown in Figure 6 I proceed to produce an ice cream or frozen delicacy in the following manner. If it is proposed to produce a chocolate coated frozen ice cream delicacy, I will place a film of chocolate upon the inner wall of the pyramidal paper container or cup 10 by coating the same with chocolate of the desired consistency; next I will place the ice cream partly refrigerated, if desired, and pack it tightly and snugly into the paper cup making this filler adhere to the coat of chocolate M in the cup. This packing of ice cream in the cup may take place after the chocolate film has been allowed to harden in the cup, as may be desired. I now take the tapered compressed portion 20 of the tubular handle body 19 and press it into the center of the ice cream filler in the cup, and anchor the same firmly into the cup so that it remains in position thereat. At this time the drip pan 16 will be caused to adhere to the ice cream filler in the paper cup and will close this paper cup effectively, but the curved flange 17 of this drip plate will skirt the base edge of this paper cup marginally in spaced relation, the handles 15 of the paper cup projecting thereabout. The light weight of the parts will be noticeable. I now place the entire assembly where same may be refrigerated to the proper degree of congealation after which the device, consisting of inverted cup, cover and handle may be fit for use.

When it is desired to eat the frozen delicacy within the paper cup the handles 15 will be grasped firmly by the operator and pulled outwardly of the frozen delicacy, as shown in Figure 8, and now the paper cup may be readily lifted off or peeled off from the ice cream or other frozen delicacy until it is entirely removed. The ice cream A will now adhere upon the drip pan, being marginally skirted by the annular curved flange 17 of the drip plate. The ice cream may now be eaten and as it melts the drippings will run down the side of the cone or ice-cream into the annular marginal portion 17 of the drip plate and, in this manner, will not drip off the drip pan upon the hands of the eater. In this way a sanitary container for frozen ice cream is produced and the chocolate coating will also remain in firm adherence upon the ice cream delicacy A, after the paper cup has been removed, thus affording a hard protective covering or shell for the same. The handle provides a convenient means for holding the container or ice cream.

From the foregoing it will readily be seen that I have provided a novel method of producing coated frozen delicacy, of keeping same intact for indefinite periods of time until same is ready to be used for consumption, and I have provided a new container holding the frozen delicacy. I do not intend to confine myself to the exact details of construction disclosed in this application but cover all variations falling within the purview of the appended claims.

Having described my invention what I desire to claim and secure by Letters Patent is as follows:—

1. In combination a conical ice cream package having its base portion open, a drip plate of a slightly larger diameter than the open base portion of the package to provide an annular lip therearound, an ice cream filling in the package to which the drip plate sticks, and manual means integrally carried by the base portion of the package by means of which the package may be forcibly separated from the ice cream.

2. As a new article of manufacture a crimped conical ice cream package having its base portion open, a drip plate closing the base portion of the package and designed to adhere to the frozen contents of the package and an integral grab handle on the base portion of the package projecting beyond the package and serving as a manual means for pulling the package expansively out of contact with the frozen contents of the package, as the latter adheres to the drip plate.

3. In combination a crimped conical package having its base portion open, a cap closing the base portion of the package and providing an annular drip portion outside of the base portion of the package and a handle flexibly carried by the base portion of the package for opening the crimps of the package to separate the package from the exterior surface of the contained frozen confection in the package.

JOHN J. NOLTE.